United States Patent [19]
Bendett et al.

[11] Patent Number: 5,875,408
[45] Date of Patent: Feb. 23, 1999

[54] AUTOMATED VEHICLE GUIDANCE SYSTEM AND METHOD FOR AUTOMATICALLY GUIDING A VEHICLE

[75] Inventors: Mark P. Bendett, Ann Arbor, Mich.; Alan Y. Aral, Davis, Calif.

[73] Assignee: IMRA America, Inc., Ann Arbor, Mich.

[21] Appl. No.: 503,049

[22] Filed: Jul. 17, 1995

[51] Int. Cl.$^6$ .............................. G05D 1/00; G01S 17/10
[52] U.S. Cl. .......................... 701/23; 180/169; 356/3.01; 356/3.1; 356/5.01; 701/300
[58] Field of Search ..................... 364/424.027, 424.029, 364/460; 180/167, 169; 250/559.29, 559.33, 559.37, 559.38; 356/3, 3.01, 3.1, 3.11, 5.01, 5.02, 5.1; 701/23, 25, 300

[56] References Cited

U.S. PATENT DOCUMENTS

| | | | |
|---|---|---|---|
| 4,049,961 | 9/1977 | Marcy ....................................... | 250/202 |
| 4,333,147 | 6/1982 | Regueiro et al. ......................... | 364/436 |
| 4,630,109 | 12/1986 | Barton ..................................... | 358/103 |
| 4,788,441 | 11/1988 | Laskowski ........................... | 250/559.38 |
| 4,790,402 | 12/1988 | Field et al. ............................... | 180/169 |
| 4,846,297 | 7/1989 | Field et al. ............................... | 180/169 |
| 4,967,064 | 10/1990 | Field et al. ........................... | 180/169 X |
| 4,996,468 | 2/1991 | Field et al. ............................... | 308/587 |
| 5,202,742 | 4/1993 | Frank et al. .............................. | 356/5.1 |
| 5,302,835 | 4/1994 | Bendett et al. .......................... | 250/561 |
| 5,347,456 | 9/1994 | Zhang et al. ............................. | 364/424 |
| 5,357,432 | 10/1994 | Margolis et al. ................. | 364/424.027 |
| 5,390,118 | 2/1995 | Margolis et al. ................. | 364/424.027 |
| 5,563,787 | 10/1996 | Murayama ....................... | 364/424.027 |

*Primary Examiner*—Jacques H. Louis-Jacques
*Assistant Examiner*—Edward J. Pipala
*Attorney, Agent, or Firm*—Burns, Doane, Swecker & Mathis, LLP

[57] ABSTRACT

An automated vehicle guidance system for guiding a movable vehicle along a predetermined desired path over a surface that is provided with at least one reference marking includes a laser radar for emitting laser pulses towards the reference marking and for receiving laser pulses reflected from the reference marking, a steering actuator for steering the vehicle, and a computer connected to the laser radar and the steering actuator. The laser radar is designed to determine the distance between the vehicle and the reference marking and that distance is used by the computer to determine the lateral position of the vehicle relative to the desired path of vehicle travel. The computer then controls the steering actuator in the manner necessary to effect guidance of the vehicle along the desired path. A method for automatically guiding a vehicle along a desired travel path involves determining the distance from a point on the vehicle to the reference marking by emitting a laser pulse and receiving the laser pulse reflected from the reference marker, determining the lateral position of the vehicle relative to the desired path based on the determined distance, and controlling the steering actuator when the lateral position of the vehicle is offset from the desired path to guide the vehicle along the desired path. The reference marking can be in the form of reflective stripes painted on the surface or white strips disposed on barriers positioned along the desired path.

21 Claims, 10 Drawing Sheets

AUTOMATED VEHICLE GUIDANCE SYSTEM AND METHOD FOR AUTOMATICALLY GUIDING A VEHICLE

FIELD OF THE INVENTION

The present invention relates to a system and method for guiding movable objects. More particularly, the present invention pertains to an automated system and method for guiding moving objects such as vehicles along a predetermined desired path.

BACKGROUND OF THE INVENTION

Automated vehicle control along highways or other types of roadways has long been desirable as a way of addressing the ever-increasing vehicle traffic. By automatically controlling the movement of vehicles along a highway or other roadway without the need for human intervention, the hope is that traffic congestion and delays will be minimized, and that the resulting traffic flow will be much smoother. One aspect of such an automated vehicle control system involves relatively accurately assessing the position of the vehicle relative to the pathway and, where necessary, appropriately steering the vehicle to ensure that the vehicle is appropriately guided along the pathway.

Systems have been proposed in the past for automatically controlling the vehicle steering operation in a manner that causes the vehicle to move along a predetermined path. One such system, which is disclosed in U.S. Pat. No. 5,347,456, utilizes magnetic markers that are embedded along the desired road or pathway. The vehicle is outfitted with a magnetic sensor that detects the magnetic markers as the vehicle moves along the roadway. Signals produced by the magnetic sensor through detection of the magnetic markers are processed by a computer. The computer then controls the steering operation of the vehicle so that the vehicle moves along the desired path.

Another system, which is disclosed in U.S. Pat. No. 4,333,147, utilizes inductive markers that are embedded along the roadway. In this system, the vehicle is provided with a detecting coil that detects the inductive markers. Signals produced by the detecting coil are utilized for guiding the vehicle along the desired path.

The system disclosed in U.S. Pat. No. 4,049,961 employs passive responders or optical reflectors that are embedded along the boundaries of the roadway defining the desired path of movement for the vehicle. Laser transmitter/receiver units are provided on the vehicle to emit a light signal that covers a certain number of the responders. The responders reflect a fraction of the emitted light and the received reflected signals are used to form an electrical signal whose amplitude and sign are indicative of the position of the transmitter along an axis transverse to a reference axis. The vehicle is then guided on the basis of these signals.

Systems such as those described in the aforementioned patents suffer from the disadvantage that in order to implement such systems, significant modification of existing roadways must be performed. That is, the roadways must be outfitted with or have embedded therein magnetic markers, inductive markers or optical reflectors. As can be readily appreciated, the need to outfit existing roadways with these additional infrastructures renders these systems quite expensive and possibly cost prohibitive. Further, considerable time and effort would be required to modify existing roadways in a manner that will permit implementation of these systems. Thus, from a practical standpoint, these systems do not represent truly effective alternatives for use in successfully implementing the automated guidance of vehicles.

Another known vehicle guidance system is disclosed in U.S. Pat. No. 4,630,109. In this system, the vehicle is outfitted with a CCD camera that periodically scans the roadway to detect an optically distinct line extending along the roadway. Signals representing successive scans of the CCD camera are stored and then correlated to determine lateral movement of the vehicle between successive scans. This information is then used to guide the vehicle along the roadway.

While this system does not necessarily require extensively outfitting existing roadways with additional infrastructures to the same extent as the other systems described above, this system does suffer from the disadvantage that proper detection of the optically distinct line requires a very complicated image processing system. Further, images captured by the CCD camera can vary widely depending upon a variety of factors such as sunlight, weather and the like so that the accuracy of the system may be somewhat suspect.

At least some of the previously proposed vehicle guidance systems suffer from other drawbacks as well. For example, some systems are not well suited to accurately and rather simply detecting the yaw angle of the vehicle. This can have an impact on the operation of the system since the orientation or yaw angle of the vehicle affects the amount by which the vehicle steering must be altered to direct the vehicle along the intended path of movement.

In addition, at least some of the previously proposed systems are not well suited for use in connection with aspects of automated vehicle guidance other than maintaining the position of the vehicle in a particular lane. That is, automated vehicle guidance involves not only guiding the movement of the vehicle in a lane, but other aspects of vehicle travel such as lane changing and the detection of vehicles or other objects in adjacent lanes so that lane changing does not occur at an inappropriate time.

In view of the foregoing, a need exists for an automated system and method for guiding moving objects such as vehicles along a predetermined desired path that is not susceptible to the same disadvantages and drawbacks associated with other known systems. Further, a need exists for a system and method for automated guidance of moving objects such as vehicles that does not require complicated image processing capabilities and also does not require the addition of costly infrastructures to existing roadways.

SUMMARY OF THE INVENTION

In accordance with one aspect of the present invention, an automated vehicle guidance system for guiding a movable vehicle having a vehicle axis along a predetermined desired path over a surface that is provided with desired path references positioned on opposite sides of the desired path includes a first laser pulse transmitter positioned on the vehicle on one side of the vehicle axis for transmitting laser pulses across the vehicle axis towards the desired path reference located on one side of the desired path, a second laser pulse transmitter positioned on the vehicle on an opposite side of the vehicle axis for transmitting laser pulses across the vehicle axis towards the desired path reference located on the opposite side of the desired path, a first laser pulse receiver positioned on the vehicle and operatively associated with the first laser pulse transmitter for receiving laser pulses transmitted by the first laser pulse transmitter and reflected from the desired path reference located on the one side of the desired path, and a second laser pulse receiver positioned on the vehicle and operatively associated with the second laser pulse transmitter for receiving laser pulses transmitted by the second laser pulse transmitter and for receiving laser pulses reflected from the desired path reference located on the opposite side of the desired path. A steering actuator is mounted on the vehicle for steering the vehicle, and a control device is connected to both the steering actuator and the first and second laser pulse receivers for controlling the steering actuator based on reflected laser pulses received by the first and second laser pulse receivers to guide the vehicle along the predetermined desired path.

In a preferred embodiment of the invention, the desired path references are in the form of reflective stripes on the surface along which the vehicle travels, the reflective stripes being spaced apart from the desired path by a predetermined distance. Alternatively, the desired path references can take the form of reflective strips positioned on barriers that are disposed on the vehicle travel surface in spaced apart relation to the desired path.

In accordance with another aspect of the invention, an automated vehicle guidance system for guiding a movable vehicle having a vehicle axis along a predetermined desired path over a surface that is provided with at least one desired path reference includes a laser radar for emitting a laser pulse along a radar axis towards the desired path reference and for receiving a laser pulse reflected from the desired path reference to determine the distance between the laser radar and the desired path reference along the radar axis. A steering actuator is connected to steerable wheels of the vehicle for steering the vehicle, and a computer is connected to the laser radar and the steering actuator for determining, based on the distance determined by the laser radar, the lateral position of the vehicle relative to the desired path and for controlling the steering actuator to guide the vehicle along the desired path.

According to another aspect of the invention, a method for automated guidance of a movable vehicle having a vehicle axis along a predetermined desired path over a surface that is provided with at least one desired path reference includes determining a distance from a point on the vehicle to the desired path reference along a radar axis by emitting a laser pulse along the radar axis towards the desired path reference and receiving the laser pulse reflected from the desired path reference, determining a lateral position of the vehicle relative to the desired path based on the determined distance, and controlling a steering actuator operatively associated with the vehicle when the lateral position of the vehicle is offset from the desired path to guide the vehicle along the desired path.

BRIEF DESCRIPTION OF THE DRAWING FIGURES

Additional features and aspects of the present invention are described below with reference to the accompanying drawing figures in which like elements are depicted by like reference numerals and wherein.

DETAILED DESCRIPTION OF THE INVENTION

Before turning to a discussion of the specific feature and details implementing the automated vehicle guidance system and method of the present invention, a general overview of the system will be explained with reference initially to FIG. 1. Generally speaking, the present invention involves guiding a vehicle 12 along a surface such as a highway or other type of roadway 14 so that the vehicle 12 travels along a desired path of movement 16. During movement of the vehicle along the surface 14, a laser pulse is emitted from a laser radar unit 24 positioned on the vehicle 12. The laser radar is positioned so that the emitted laser pulse is directed towards a desired path reference 22 disposed along the desired path of movement. Also, the laser pulse is emitted at an oblique angle with respect to the vehicle axis.

Figure 1:
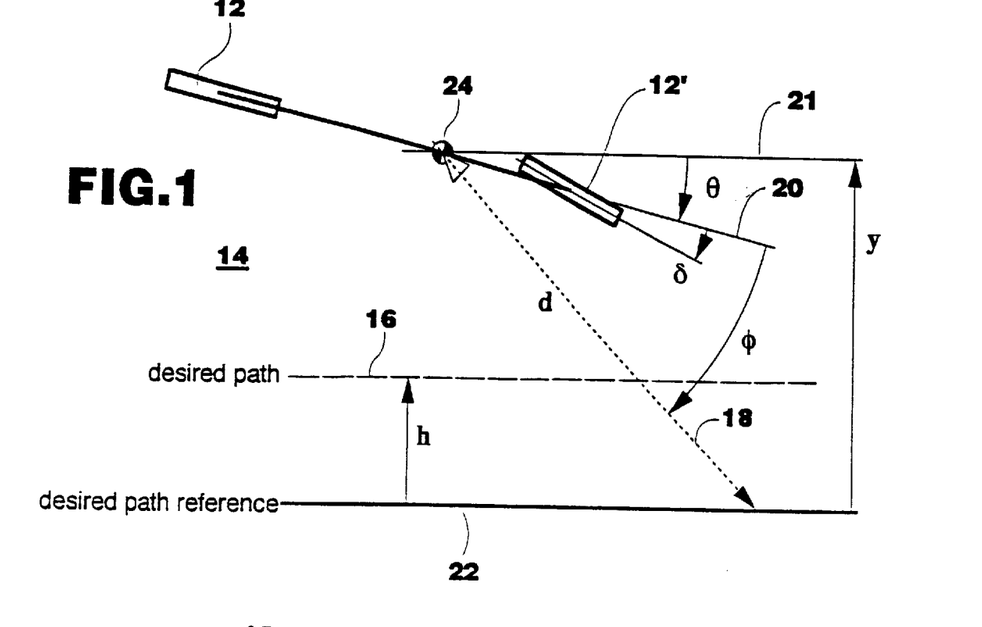
FIG. 1 is a schematic illustration of a vehicle travelling along a surface and depicts various characteristics associated with the automated vehicle guidance system and method of the present invention.

In the schematic illustration shown in FIG. 1, the angle θ represents the yaw angle of the vehicle 12 (i.e., the angle between the vehicle axis 20 and the lateral position of the vehicle along a line 21 generally parallel to the desired path 16), the angle φ represents the angular offset of the laser radar axis 18 with respect to the vehicle axis 20, the angle δ represents the front wheel steering angle of the vehicle 12, the distance y represents the lateral position of the vehicle 12 relative to the desired path reference 22, and the distance h represents the fixed offset of the desired path 16 relative to the desired path reference 22.

The laser pulse emitted by the laser radar unit 24 is emitted along a laser radar axis 18 and is reflected off the desired path reference 22 towards which it is directed. The reflected laser pulse is then received by the laser radar unit 24. The laser radar unit 24 calculates the distance d between a point on the vehicle (i.e., the location of the laser radar unit 24) and the desired path reference 22 as measured along the laser radar axis 18. That distance d, combined with the known angle φ of offset between the laser radar axis 18 and the vehicle axis 20, permits determination of the approximate lateral position y of the vehicle relative to the desired path reference 22. In the system shown in FIG. 1, the lateral position y of the vehicle 12 is an approximation because the yaw angle θ of the vehicle is not known. However, since the yaw angle θ is typically quite small in the case of vehicles travelling at highway speeds, the estimated lateral position y of the vehicle is usually quite accurate.

Once the distance h between the desired path 16 and the reference 22 has been set for the system, this value remains constant and fixed. Thus, it is possible to determine the position of the vehicle 12 relative to the desired path 16. Then by controlling the steering actuator associated with the vehicle 12, the steering angle δ of the vehicle 12 can be changed (as represented by the subsequent vehicle position 12' shown in FIG. 1) to thereby guide the vehicle along the desired path 16.

Figure 3:
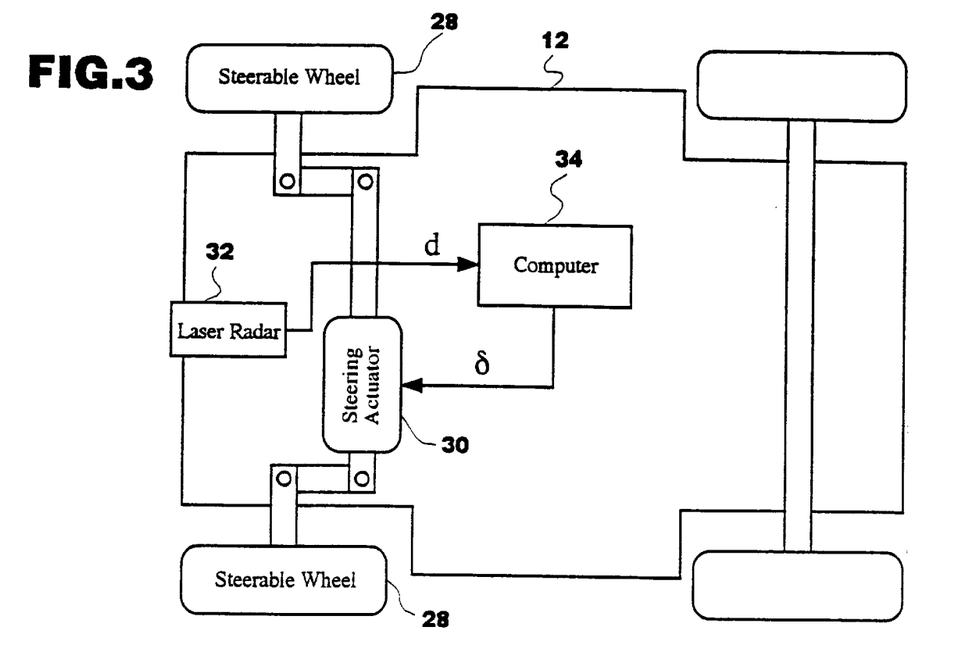
FIG. 3 is a schematic illustration of a vehicle outfitted with an automated vehicle guidance system according to one aspect of the present invention.

Having described the general operation of the automated vehicle guidance system of the present invention, reference is made to FIG. 3 for a more detailed description of the various features by which the system is implemented. As seen in FIG. 3, the automobile 12 is provided with two steerable front wheels 28 that are connected to a steering actuator 30 which moves the wheels 28 to steer the vehicle 12. The vehicle is also provided with a laser radar 32 that is positioned at the front center portion of the vehicle. It is to be understood, however, that the laser radar 32 can be positioned at other locations on the vehicle. The laser radar 32 is connected to a central computer 34 which receives information from the laser radar 32, processes that information to determine the lateral position of the vehicle, and then outputs an appropriate signal to the steering actuator 30 to change or control the front wheel steering angle δ.

Figure 6:
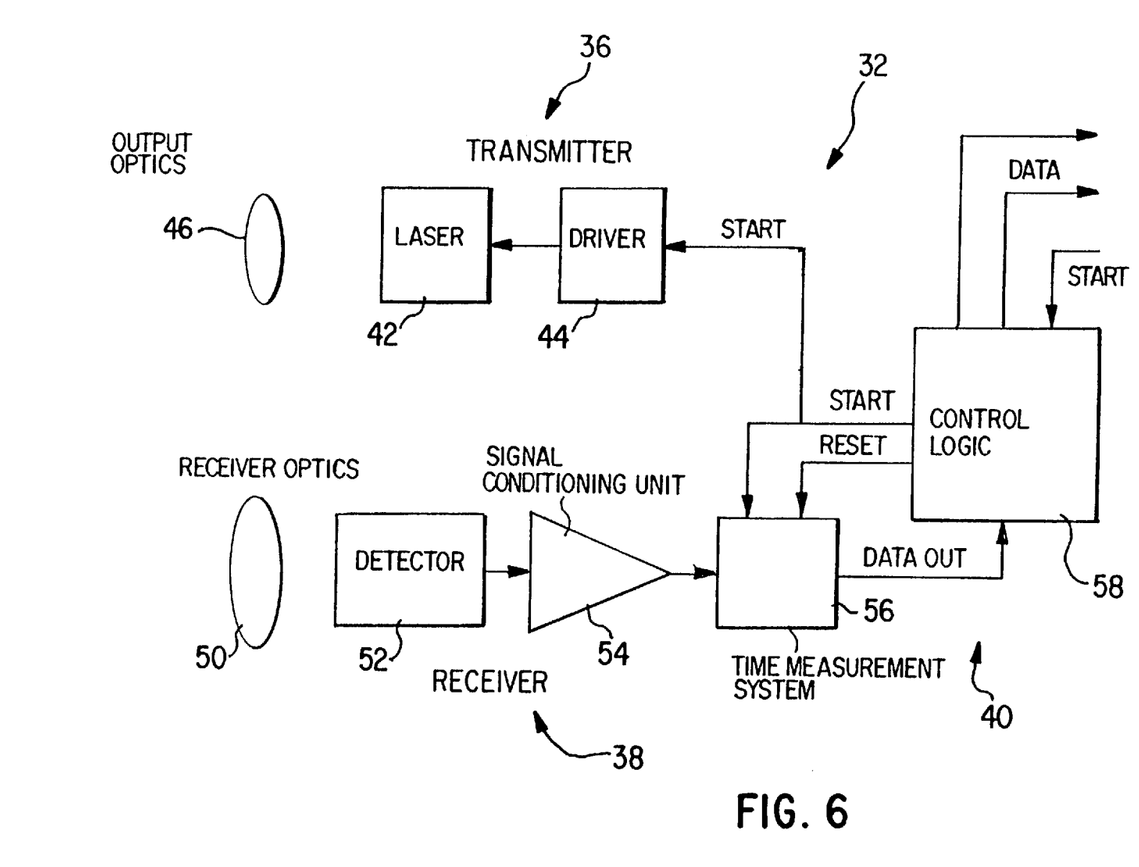
FIG. 6 is a block diagram illustrating various features of the laser radar utilized in the automated vehicle guidance system shown according to one aspect of the present invention.

The features associated with the laser radar 32 are depicted in FIG. 6. Generally speaking, the laser radar 32 includes three parts—a transmitter 36, a receiver 38, and a logic arrangement 40. The transmitter 36 is designed to transmit or emit laser pulses directed at the desired path reference, the receiver 38 is designed to receive laser pulses reflected from the desired path reference and the logic arrangement is designed to perform various operations which result in determination of the distance d between the laser radar 32 and the desired path reference along the laser radar axis.

The transmitter 36 includes a laser 42, a driver 44 that is connected to the laser 42 for effecting operation of the laser and emission of laser pulses, and output optics 46. The laser 42, the driver 44 and the output optics 46 can be of known construction and since the present invention described herein does not involve the specific details of such features, a detailed description of those features is not included here.

The receiver 38 for receiving the laser pulse beam reflected from the desired path reference 22 includes receiver optics 50 for receiving the reflected laser pulses, a detector 52, and a signal conditioning unit 54. The receiver optics 50 may be in the form of a single or multiple aperture system depending upon the requirements and characteristics of the system. For example, receiver optics 50 in the form of a single aperture may be preferred from a cost effective standpoint, but if it is found that a single aperture arrangement provides an unacceptable field of view, a multiple aperture system can be employed.

The detector 52 detects the reflected laser pulse beam received by the receiver optics 50 and transforms the optical signal into an electronic signal. The detector 52 may be in the form of a single photosensitive diode such as a single PIN diode or alternatively, could be an avalanche photodiode (APD). Once again, the appropriate detector can be selected based on the requirements and characteristics of the system. For example, since the distances involved in implementing the automated guidance system are relatively short, the sensitivity associated with an avalanche photo-diode may not be necessary. Thus, a single PIN diode is preferable.

Connected to the detector 52 is a signal conditioning unit 54. The signal conditioning unit 54 preferably includes features not specifically depicted in FIG. 6 such as a preamplifier, a postamplifier, and pulse detection circuitry. The signal conditioning unit 54 receives the current from the detector 52, changes that current to voltage, amplifies the voltage and then detects either the leading edge or the center of the voltage. Depending upon the configuration of the detector 52, more than one signal conditioning unit 54 may be employed (i.e., a signal conditioning unit can preferably be provided for each photosensitive diode).

The logic 40 consists of a time measurement system 56 (e.g., a high speed counter or RC circuit) that is adapted to determine the distance d from the laser pulse transmitter to the desired path reference 22 along the laser pulse axis based on time-of-flight. The time measurement system 56 is connected to a control logic 58 so that the distance d determined by the time measurement system 56 is fed to the control logic 58. The control logic 58 is designed to control various aspects of the system such as the timing of laser pulses emitted by the laser transmitter, the resetting of the time measurement system, the starting of the counting operation performed by the time measurement system, initial data processing, data formatting, and data transmission. Thus, as seen in FIG. 6, the control logic is connected to the laser driver 44 and the time measurement system 56 along various signal lines.

The control logic 58 is also connected to the computer 34 depicted in FIG. 3 along several signal lines for purposes of signalling to the computer 34 the presence of data or information (i.e., the distance d) needed by the computer 34 for determining the appropriate steering angle of the vehicle and for transmitting to the computer the needed information or data. The computer 34 also controls the start of the control logic 58.

As generally depicted in FIG. 3, the distance d determined by the laser radar 32 is then sent to the computer 34. The computer 34 then calculates the steering angle δ necessary to guide the vehicle along the desired path and the appropriate information is then sent to the steering actuator to effect the necessary steering control.

Figure 9:
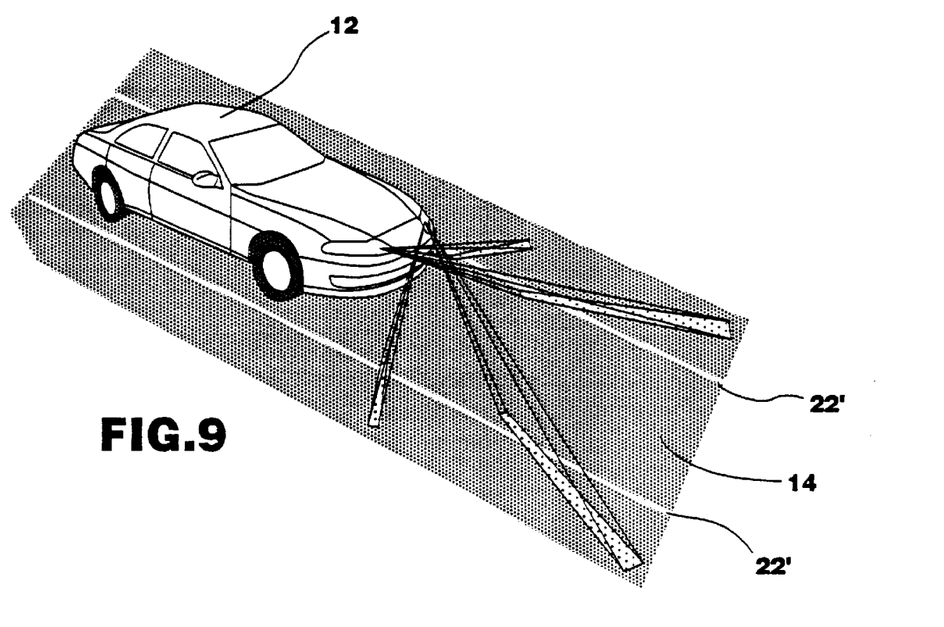
FIG. 9 is a perspective view of a vehicle travelling along a highway or other road surface illustrating one form of the desired path reference towards which the laser pulses are directed and also illustrating an arrangement for the laser radar units in which laser pulses are directed in a crossing pattern from two different laser radar units.
Figure 10:
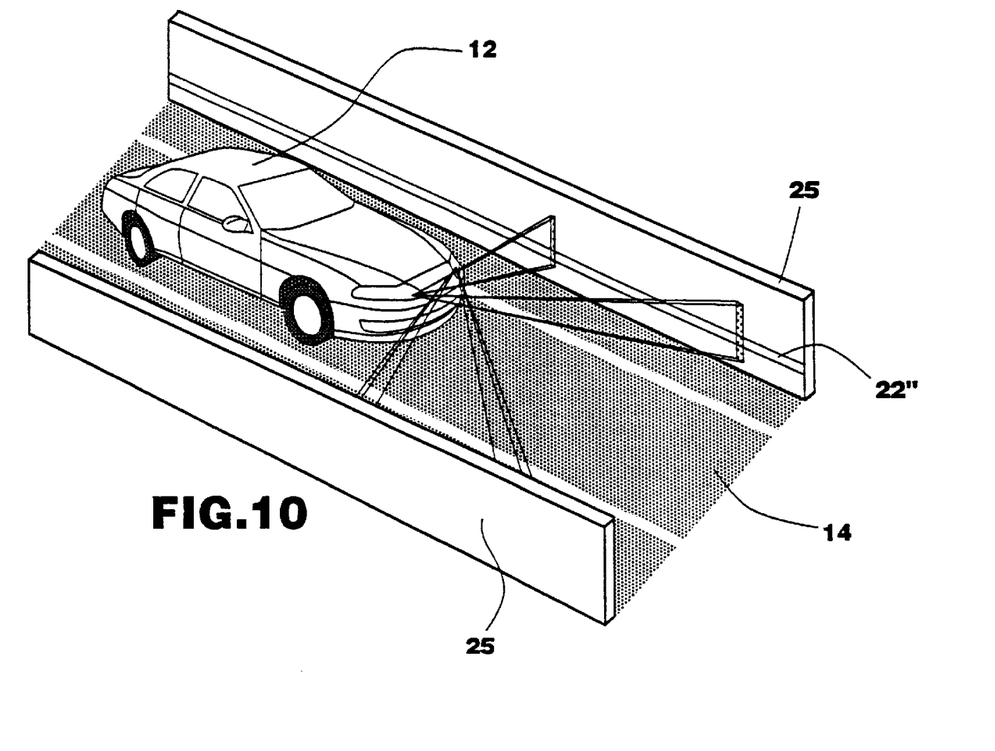
FIG. 10 is a perspective view of a vehicle travelling along a highway or other road surface illustrating another form of the desired path reference towards which the laser pulses are directed.
Figure 11:
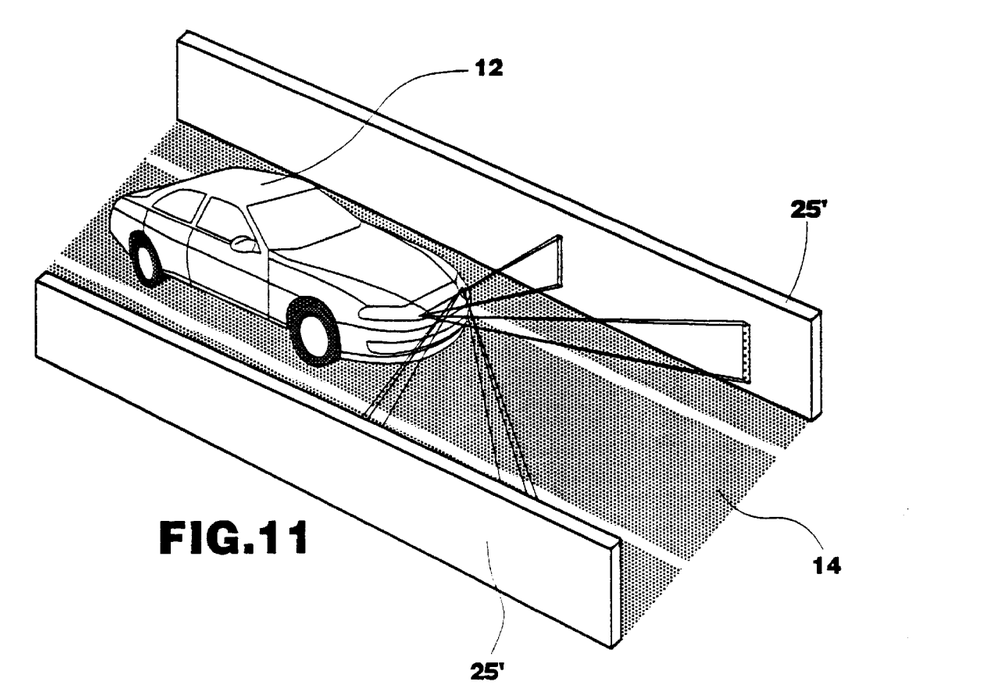
FIG. 11 is a perspective view of a vehicle travelling along a highway or other road surface illustrating another form of the desired path reference towards which the laser pulses is directed.

As described above with reference to FIG. 1, the automated vehicle guidance system of the present invention involves emitting laser pulses at a desired path reference 22 positioned along the desired path 16. FIGS. 9, 10 and 11 illustrate three different forms of the desired path reference for use in connection with the system of the present invention. With reference to FIG. 9, the desired path reference is in the form of lane markings 22' typically found on road surfaces. These reference marking 22' can be, for example, longitudinally extending white painted lines or stripes, or white tape strips such as commercially available 3M retro tape. The longitudinally extending reference markings 22' can be continuous lines or strips that extend along the lanes for whatever distance the automated vehicle guidance system is to be employed. Alternatively, the painted lines or tape strips can be in the form of discrete lengths that extend along the lanes of the road surface.

The tape or the paint should possess generally reflective characteristics sufficient for reflecting the laser pulses emitted by the laser pulse transmitter. It is envisioned that other reflective materials can be employed so long as they are capable of reflecting the laser pulses transmitted by the laser transmitter.

The use of a desired path reference in the form of the reference markings 22' shown in FIG. 9 provides the advantage of not having to modify existing road surfaces since most roads contain lane markings such as those shown in FIG. 9. To the extent highways or other roadways require the addition of the desired path reference markings 22', such reference markings can be rather easily applied with little cost expenditure.

On some highways or other roadways, barriers (commonly referred to as Jersey barriers) are positioned along the road surface. In accordance with another aspect of the invention shown in FIG. 10, it is possible to use these barriers as the surface on which are disposed the desired path reference markings. As illustrated in FIG. 10, white paint or white tape 22" can be applied to the inwardly facing vertical surfaces of the barriers 25. For those highways or roads where the use of barriers such as shown in FIG. 10 are prevalent, little cost would be required to outfit the barriers with the appropriate reference markings 22".

In accordance with another embodiment of the present invention illustrated in FIG. 11, the barrier 25' can actually form the desired path reference towards which the laser pulses are directed and from which such laser pulses are reflected. This is possible because of the generally vertical or upright orientation of the barriers.

In use, the laser transmitter will emit a laser pulse beam that is relatively narrow in the horizontal field of view (i.e., parallel to the road surface). If the laser transmitter is used in conjunction with a desired path reference in the form of reference markings 22' similar to those shown in FIG. 9, the vertical field of view of the emitted beam will likely have to be larger than when the desired path reference marking is in the forms shown in FIGS. 10 and 11. The larger vertical field of view will be necessary to ensure that the beam covers an adequate distance along the road surface sufficient to encompass the desired path reference marking 22'. In the case of reference markings 22" placed on the barriers 25, the vertical field of view can be much smaller since the beam can more easily encompass the desired path reference marking 22". The vertical field of view can likewise be smaller when the barriers 25' themselves form the desired path reference.

Referring once again to FIG. 1, the laser radar unit 24 emits a laser pulse along the laser radar axis 18 and then receives the reflected laser pulse, whereupon the actual or absolute distance d between the vehicle (i.e., the location on the vehicle of the laser radar unit 24) and the desired path reference 22 is determined. From that information, the laser radar unit 24 calculates the lateral position y of the vehicle relative to the reference marking based on the following equation.

$$y = d \cdot \sin \phi$$

When the system is designed in the manner shown in FIG. 1 where only a single laser pulse is emitted at any given time, if the vehicle is oriented in a manner that produces a yaw angle θ, the determination of the distance d will actually be an estimation since the value of the yaw angle will be unknown. However, as noted above, this estimated distance d will typically be sufficiently accurate since the vehicle yaw angle θ at highway speeds is usually quite small.

Once the lateral position of the vehicle relative to the desired path reference marking 22 is known, the distance between the lateral position of the vehicle and the desired path 16 of the vehicle can be easily determined by the following equation since the distance between the desired path 16 and the desired path reference marking 22 is a fixed known value.

distance to desired path=y−h

Having determined the distance between the lateral position of the vehicle and the desired path 16 of the vehicle, the steering angle δ of the vehicle can be appropriately controlled by the computer 34 to effect guidance of the vehicle along the desired path 16.

Figure 2:
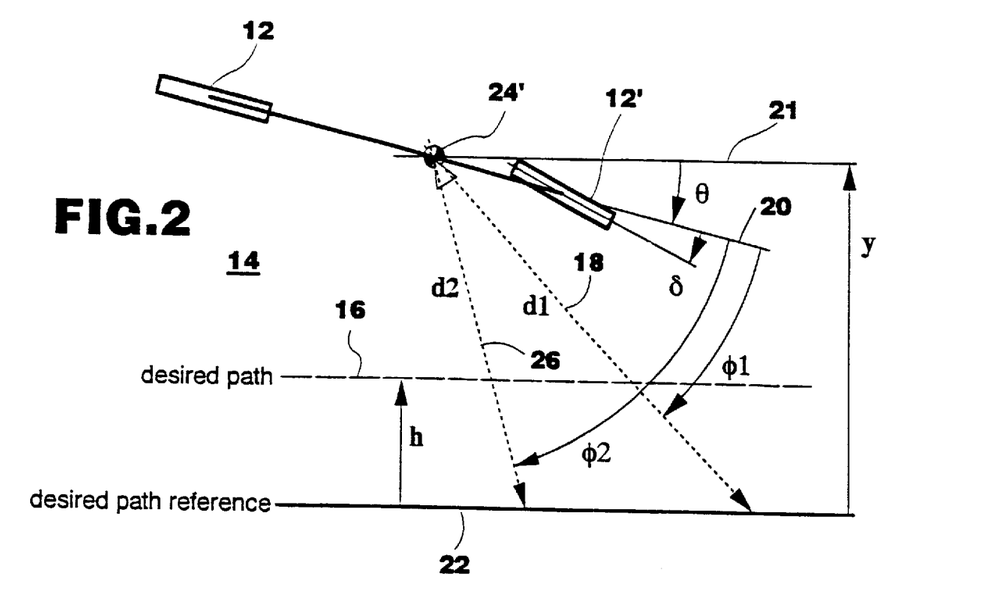
FIG. 2 is a schematic illustration of a vehicle travelling along a surface and depicts various features and characteristics associated with the automated vehicle guidance system and method according to another aspect of the present invention.

FIG. 2 represents a variation on the system illustrated in FIG. 1. Here, a laser radar unit 24 is employed which emits substantially simultaneously two laser pulses along two different laser radar axes. One of the laser pulses is directed towards the desired path reference 22 along a laser radar axis 18 that forms an angle φ1 with respect to the vehicle axis 20 and the other laser pulse is directed towards the desired path reference 22 along a laser radar axis 26 that forms an angle φ2 with respect to the vehicle axis 20. The reflected laser impulses are received by the laser radar unit 24 and the appropriate distances d1, d2 along the respective axes 18, 26 are determined. Those distances d1, d2 in conjunction with the respective angles φ1, φ2 permit determination of two values y1, y2 for use in determining the lateral position y of the vehicle in a manner described in more detail below. By emitting two laser pulses substantially simultaneously and determining two distances d1, d2, it is possible to determine the yaw angle θ of the vehicle. This then allows the lateral position y of the vehicle to be precisely determined, rather than approximately determined as in the case of the FIG. 1 system where only a single laser pulse is emitted at any one time. Thus, great accuracy in vehicle guidance can be obtained.

Figure 7:
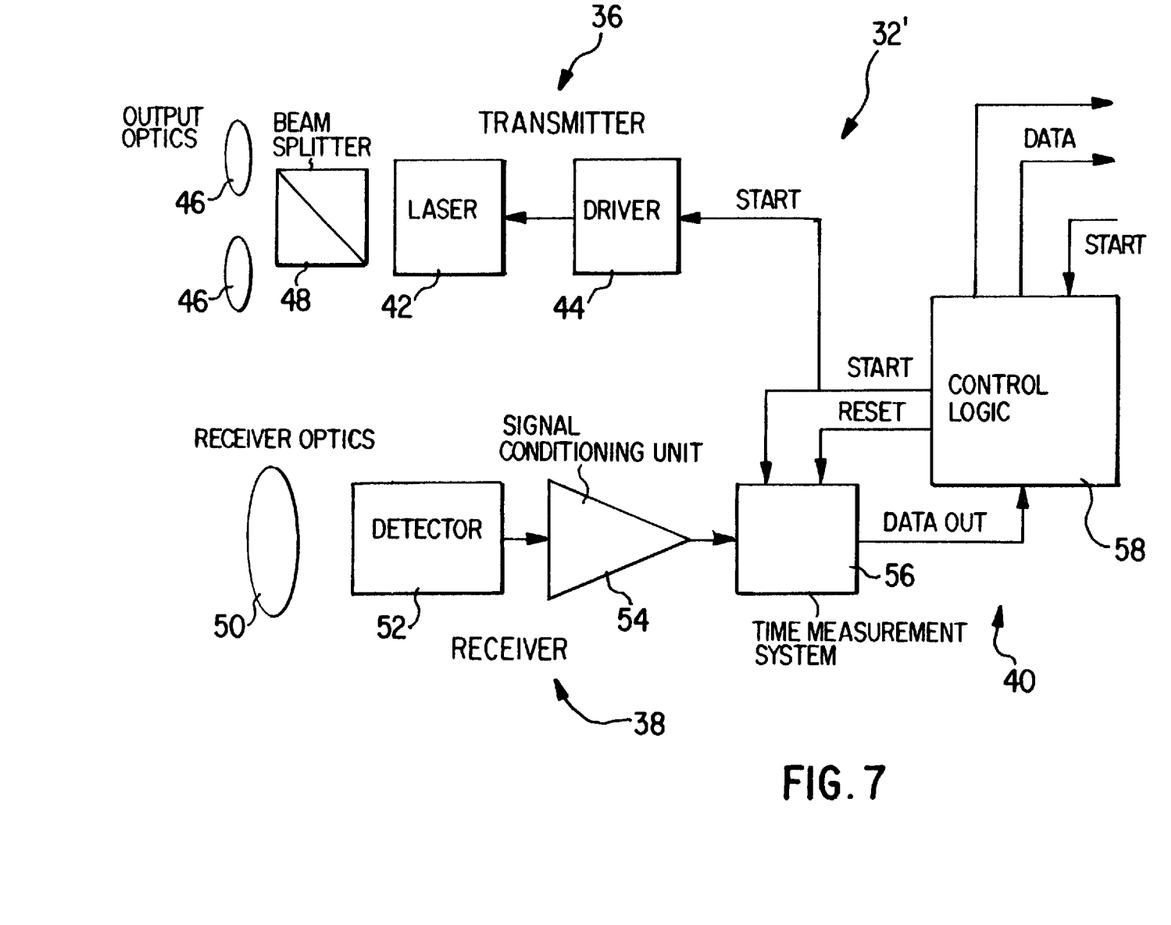
FIG. 7 is a block diagram illustrating various features of the laser radar utilized in the automated vehicle guidance system according to another aspect of the present invention.

To implement the system shown in FIG. 2, the laser radar can take the form illustrated in FIG. 7. This form of the laser radar unit 32 is substantially the same as that shown in FIG. 6 except that a beam splitter 48 is employed between the laser 42 and the output optics 46. The beam splitter 48 splits the energy from the laser 42 in half into two different beams which are then directed through respective output optics 46 towards the desired path reference 22. Thus, a single laser and laser driver can be employed to emit multiple beams, and a single receiver/detector unit can be employed to detect and receive the reflected laser pulse. This results in minimization of the required components.

Separate output optics 46 or apertures are preferably employed in the multiple measurement system depicted in FIGS. 2 and 7 since the beams will need to be distributed over a relatively wide area. Also, the use of respective output optics for each of the beams will permit different shape beams to be employed to provide wider beams as the system requires (e.g., the beams directed nearer to the vehicle may need to be wider than the beams directed farther away from the vehicle since the farther distance traveled by the latter beams will provide a wider area of coverage at the point where the beam meets the reference marking 22).

The beam splitter 48 can be a cube, a partial mirror, a hologram or any other known type of device for splitting the optical energy produced by the laser 42. Also, the beam splitter 48 is preferably designed to split the optical energy in a way that directs the laser pulse beams in the desired direction along the respective radar axes 18, 26 (i.e., at the desired angle φ relative to the vehicle axis).

Referring once again to FIG. 2, the system is designed as noted above to emit substantially simultaneously two laser pulse beams along different laser radar axes 18, 26 that are each oriented at a different angle φ1, φ2 with respect to the vehicle axis 20. The reflected laser pulses are received by the receiver optics 50, detected by the detector 52 and conveyed to the signal conditioning unit 54. The actual or absolute distances d1, d2 are determined by the logic 40 and appropriate information concerning those signals is then sent to the computer 34. The computer 34 then uses that information concerning the distances d1, d2 in conjunction with the known angle φ1, φ2 by which each laser pulse axis is offset from the vehicle axis to calculate both the yaw angle θ1, θ2 of the vehicle and the lateral position y of the vehicle. Those values are determined according to the following equations.

$$\theta = \tan^{-1}[(d2 \cdot \sin\phi2 - d1 \cdot \sin\phi1)/(d1 \cdot \cos\phi1 - d2 \cdot \cos\phi2)]$$

$$y = d1 \cdot \sin(\theta + \phi1) = d2 \cdot \sin(\phi + \phi2)$$

When two laser pulses are emitted substantially simultaneously to produce two distance measurements d1, d2, it is possible to determine the lateral position y of the vehicle utilizing either the distance d1 or the distance d2. To the extent the distances d1 and d2 may not be precisely equal to one another due to small operating errors or the like in the system, the lateral offset y of the vehicle can be calculated using the smaller of the two values d1, d2. This determination of the lateral position y of the vehicle takes into account the yaw angle θ of the vehicle and thus represents the precise lateral position of the vehicle.

Once the lateral position y of the vehicle has been determined, the offset of the vehicle relative to the desired path can be easily calculated by simply subtracting the fixed offset h of the desired path 16 from the desired path reference 22. The result is the lateral distance between the position of the vehicle (i.e., the position of the laser radar unit) relative to the desired path. Knowing that distance, the steering angle δ of the steerable wheels on the vehicle can be appropriately altered by the steering actuator in order to guide the vehicle along the desired path 16.

Figure 12:
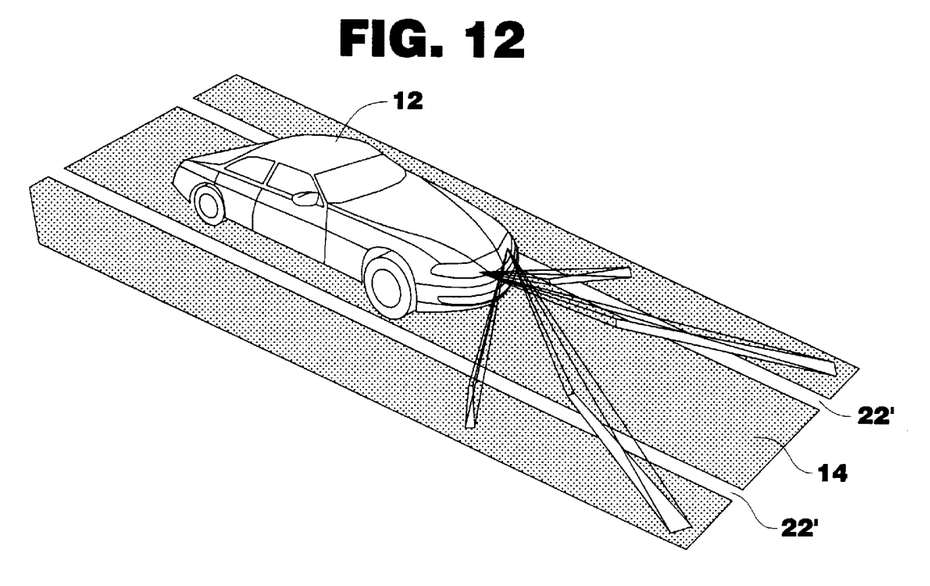
FIG. 12 is a perspective view of a vehicle travelling along a highway or other road surface illustrating a desired path reference similar to that shown in FIG. 9 and depicting a single laser radar unit emitting multiple laser pulses in different directions.
Figure 13:
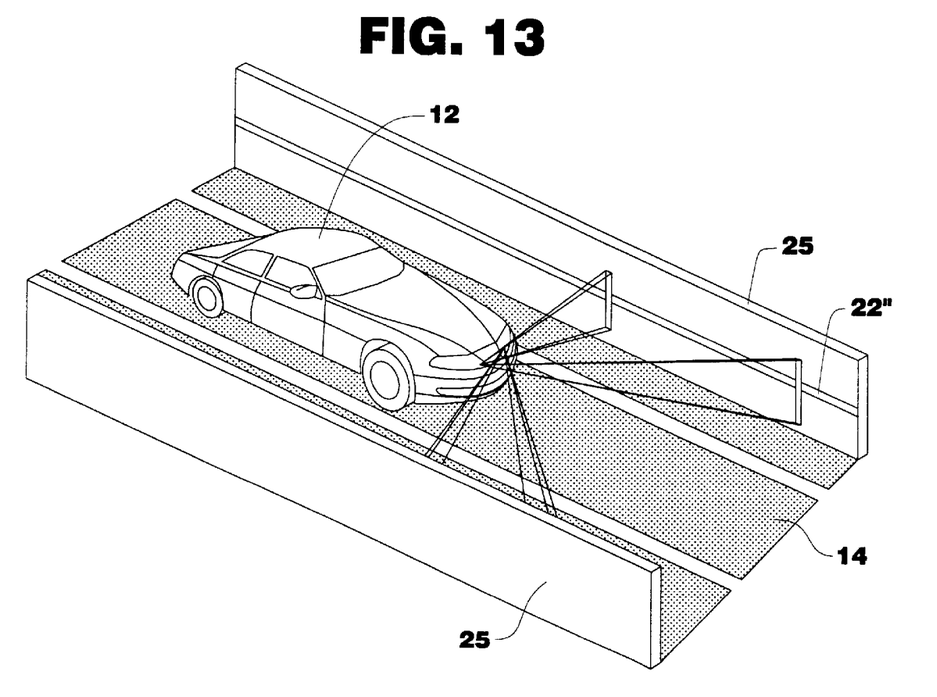
FIG. 13 is a perspective view of a vehicle travelling along a highway or other road surface illustrating a desired path reference similar to that shown in FIG. 10 and depicting a single laser radar unit emitting multiple laser pulses in different directions.

The system described above with reference to FIGS. 2 and 7 is advantageous in that it provides an extremely accurate system for detecting the lateral position of the vehicle so that the steering angle can be precisely controlled in a manner that results in reliable guidance of the vehicle along the desired path. FIGS. 12 and 13 illustrates a multiple beam system in which more than two laser pulse beams are emitted substantially simultaneously from a single laser radar unit. This modification can be implemented by suitably altering or replacing the beam splitter shown in FIG. 7, as well as other necessary components of the system, so that multiple laser pulse beams each directed at a different angle φ result from a single laser pulse emitted by the laser.

Figure 4:
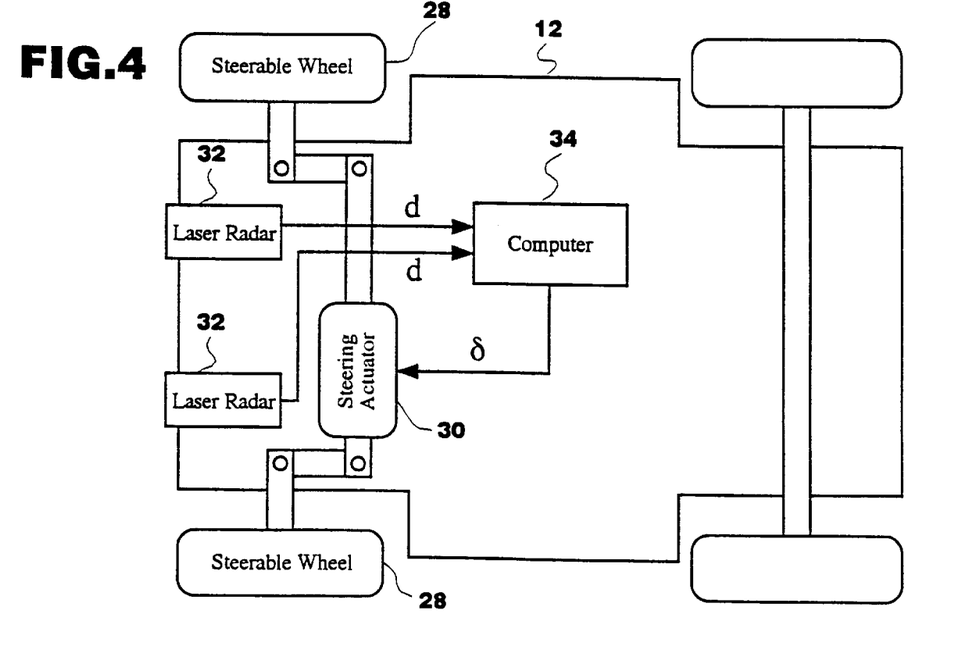
FIG. 4 is a schematic illustration of a vehicle outfitted with an automated vehicle guidance system according to another aspect of the present invention.

The advantages associated with the above-described multiple laser pulse beam system can be modified in the manner shown in FIG. 4 to provide even further advantages. As shown in FIG. 4, the automated vehicle guidance system can be designed to include a pair of laser radars 32, 32, each positioned on one side of the longitudinal axis of the vehicle. Each of the laser radar units 32 is designed to emit substantially simultaneously two laser pulse beams at respective sides of the vehicle (i.e., the laser radar on the right side of the vehicle emits two laser pulse beams towards the desired path reference that is positioned on the right side of the desired path with respect to the direction of vehicle travel while the laser radar on the left side of the vehicle emits two laser pulse beams towards the desired path reference that is positioned on the left side of the desired path with respect to the direction of vehicle travel).

The laser radars 32, 32 are preferably mounted near the headlight positions of the vehicles. Each of the laser radars 32, 32 includes features similar to those shown in FIG. 7. In addition, the laser radars 32, 32 are connected to the computer 34 along appropriate signal lines to provide communication between the laser radars 32, 32 and the computer 34 in a way that provides for the exchange of necessary information and control of the overall operation of the system in a manner similar to that described above. If desired, the laser radars 32, 32 in the system depicted in FIG. 4 can be designed in the manner shown in FIG. 6 so that each laser radar 32, 32 emits a single laser pulse beam at a given time.

The system shown in FIG. 4 in which a pair of laser radars 32, 32 are employed offers the additional advantage that if one of the laser radars 32, 32 becomes non-operational, the system is still capable of providing automated guidance of the vehicle on the basis of the information derived by the other laser radar 32. Further, to the extent there may be an obstruction (e.g., a vehicle in an adjacent lane) blocking the field of view of one of the laser radars, the other laser radar is able to provide appropriate information for controlling the vehicle movement. Thus, this aspect of the invention provides a built-in redundancy to the system.

A further modification can be incorporated into the automated vehicle guidance system described above with reference to FIG. 4. As shown in FIGS. 9 and 10, each of the laser radars can be mounted on the vehicle 12 so that the laser pulse beams emitted by the laser radars cross one another and are directed across the front of the vehicle (i.e., across the vehicle axis) towards the desired path reference on the opposite side of the vehicle. That is, the laser radar on the right side of the vehicle points left while the laser radar on the left side of the vehicle points right. Thus, the laser pulse beams emitted by the laser radars form a crossing pattern in front of the vehicle.

The laser radar arrangement illustrated in FIGS. 9 and 10 is quite useful in that when the system is designed to interact with desired path reference markers are located on the road surface, it is possible to detect the reference marker even when the vehicle is closely approaching or possible even straddling the reference marker. Also, this arrangement of laser radars permits a reduction in the required field of view, dynamic range and bandwidth requirements of the radars.

Figure 5:
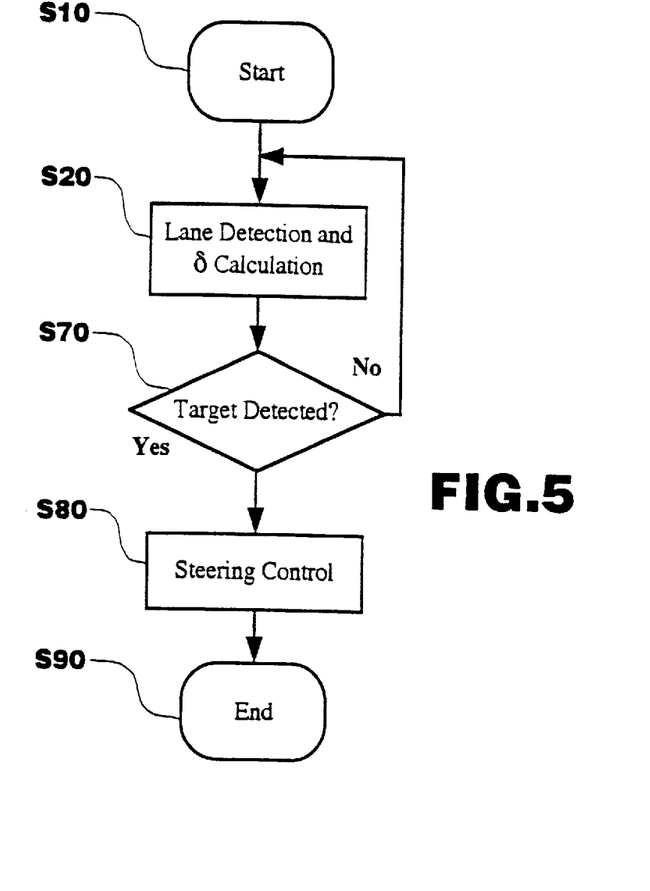
FIG. 5 is a flowchart illustrating an operating sequence of the automated vehicle guidance system of the present invention.

FIG. 5 illustrates the program associated with the automated vehicle guidance system of the present invention. The operation of the guidance system begins at step S10 when an individual operating the vehicle pushes a button to actuate the automated vehicle guidance system. That is, the system according to the present invention is preferably actuated through manual operation of a switch or the like. In that way, the vehicle can be driven in the typical manner in areas where features are not in place to effect automated guidance of the vehicle. On the other hand, when the vehicle reaches an area that is outfitted with the features necessary for effecting automated vehicle guidance, the vehicle operator can actuate the automated vehicle guidance system by manually operating the appropriate switch or the like.

Once the system has been actuated, a lane detection and steering angle δ calculation subroutine which is described in more detail below is performed at step S20. If the system determines that no target has been detected at step S70, the program returns for implementation of the lane detection and δ calculation subroutine once again. On the other hand, if a target has been detected in step S70, steering control is effected in step S80 whereupon the end of the program is reached in step S90.

Figure 8A:
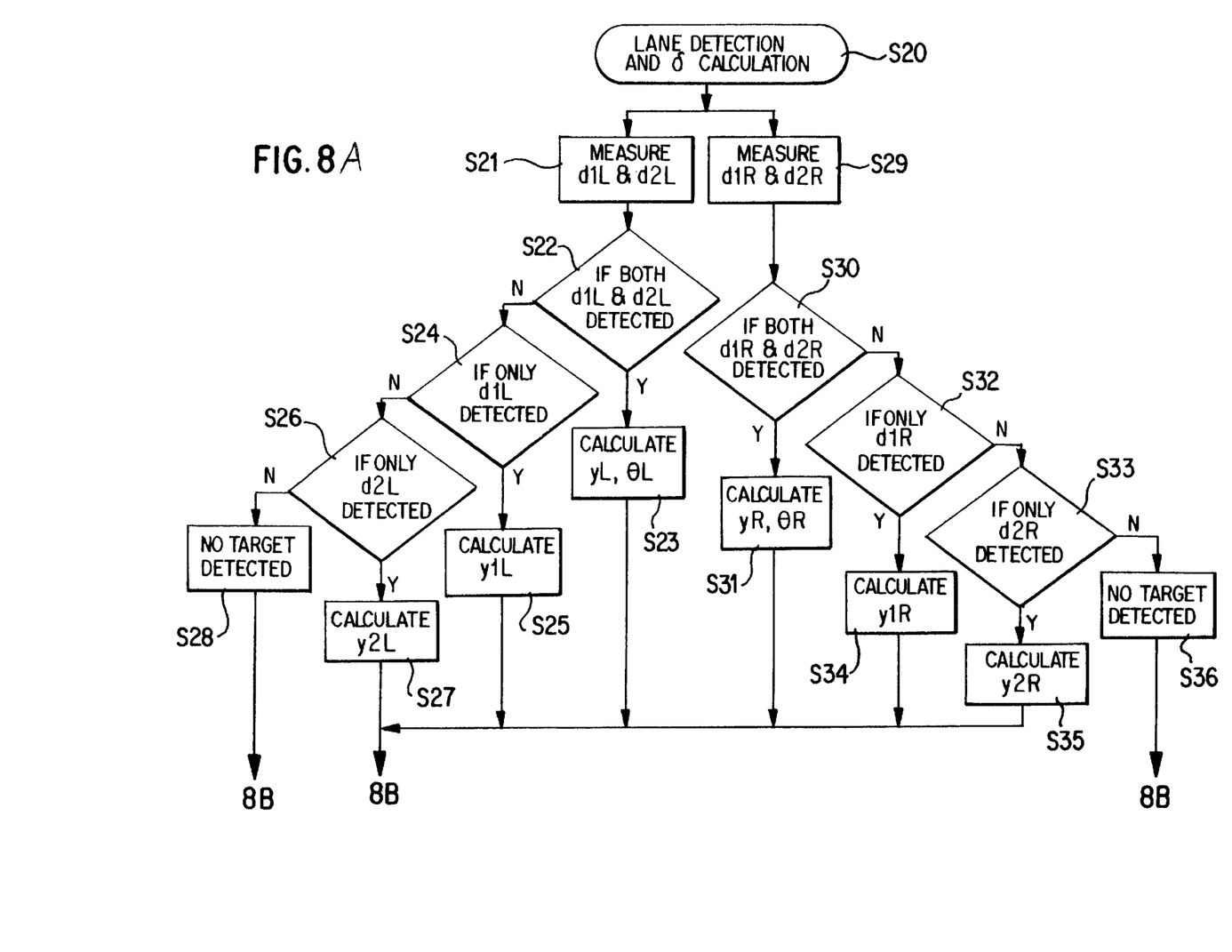
FIG. 8 is a subroutine flowchart illustrating the lane detection and steering angle calculation associated with the flowchart depicted in FIG. 5.
Figure 8B:
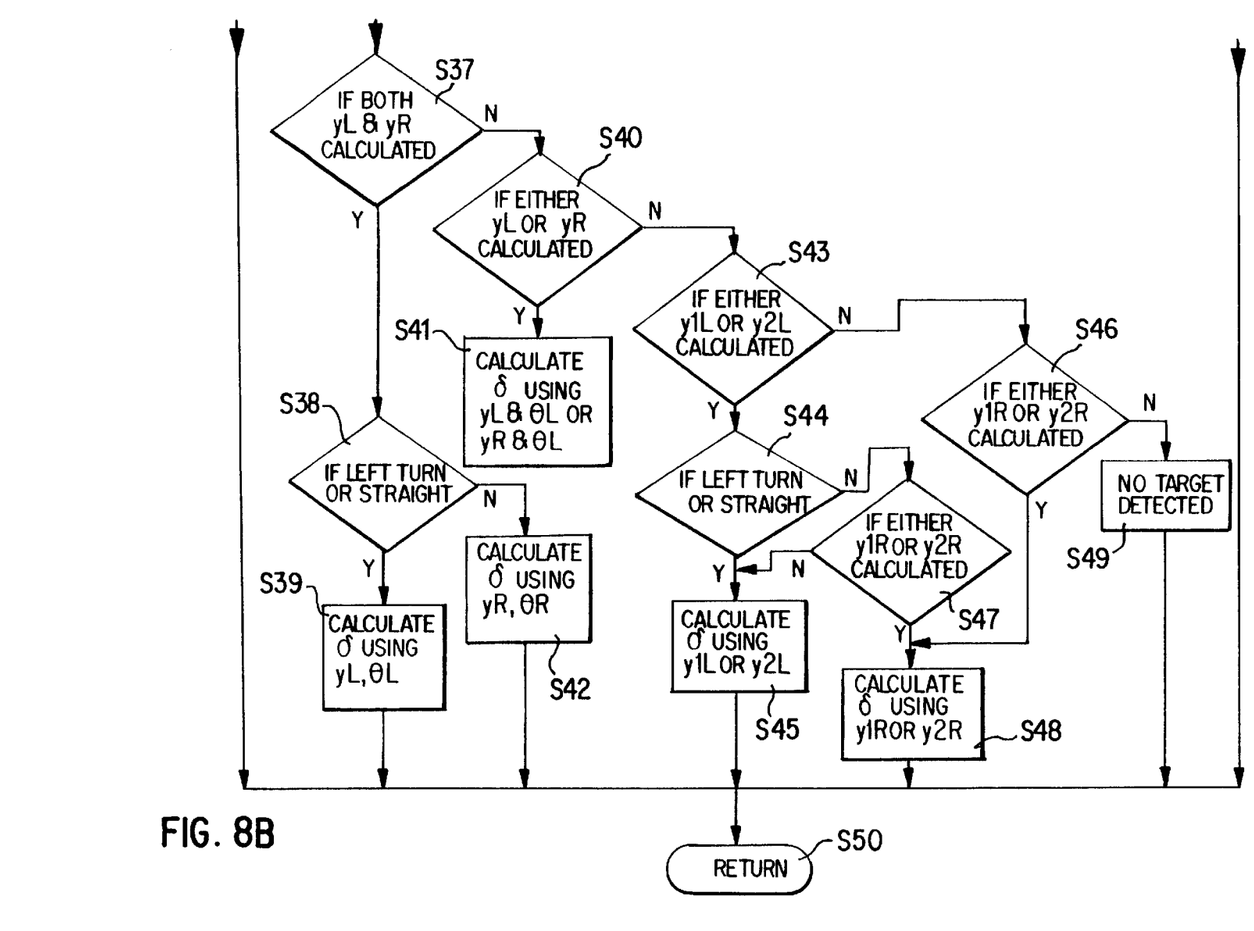

FIG. 8 depicts the lane detection and steering angle δ calculation subroutine generally identified as step S20 in FIG. 5. The subroutine depicted in FIG. 8 is used in connection with systems such as those shown in FIGS. 4, 9 and 10 where a pair of laser radars is employed for emitting laser pulses to both sides of the vehicle. It is to be understood, however, that a similar subroutine, appropriately modified, can be employed for those systems in which a single laser radar is employed.

The suffixes L in FIG. 8 represent distances or other measured attributes associated with the laser radar positioned on the left side of the vehicle (as seen from the driver's viewpoint) whereas the suffixes R represent distances or other measured attributes associated with the laser radar positioned on the right side of the vehicle (as seen from the driver's viewpoint).

In the lane detection and steering angle δ calculation subroutine shown in FIG. 8, the distances d1L and d2L are determined or measured in step S21. In step S22, if both of the distances d1L and d2L are detected, the yaw angle of the vehicle is also determined on the basis of the equation noted above. Also in step S23, the lateral position of the vehicle yL is determined. This determination of the lateral position of the vehicle yL can be determined, as noted above, by choosing the one value (y1L or y2L) that is associated with the shorter distance d1L, d2L since such a value is likely to be more accurate than the value associated with the longer distance.

At step S22, if both d1L and d2L are not detected, but it is determined at step S24 that only the distance d1L has been determined, y1L is calculated at step S25. Otherwise, the value y2L is detected at step S27 if it is decided at step S26 that only the distance d2L has been determined. If neither the distance dIL nor the distance d2L is detected, it is determined at step S28 that no target has been detected and the program once again starts over.

In steps S29–S36, a similar series of steps is carried out when laser pulses are emitted from the laser radar positioned at the right side of the vehicle.

At step S37, if the values yL and yR have both been calculated, it is determined at step S38 whether the vehicle is either turning left or is heading straight. If the vehicle is either turning left or is heading straight, the vehicle steering angle δ is calculated using the values yL and φL at step S39. On the other hand, if it is determined at step S38 that the vehicle is neither turning left nor heading straight, the vehicle steering angle δ is calculated at step S42 using the yaw angle φR and lateral position yR determined from laser pulses emitted by the laser radar on the right side of the vehicle.

At step S37, if the lateral position yL and yR of the vehicle have not both been calculated, the subroutine proceeds to step S40 where it is determined whether either one of the values yL or yR has been calculated. If so, the steering angle δ is calculated at step S41 using either the yaw angle φL and lateral position yL determined by laser pulses emitted from the laser radar on the left side of the vehicle, or the yaw angle φR and lateral position yR determined by laser pulses emitted from the laser radar on the right side of the vehicle. If neither yL nor yR has been calculated at step S40, it is determined at step S43 whether y1L or y2L has been calculated. If so, it is determined at step S44 whether or not the vehicle is turning left or is proceeding straight. If the vehicle is turning left or is proceeding straight, the steering angle δ is calculated at step S45 using the appropriate value y1L or y2L.

If it is determined at step S44 that the vehicle is neither proceeding straight nor turning left, the subroutine proceeds to step S47 where it is determined whether either y1R or y2R has been calculated. If not, the subroutine proceeds back to step S45 for calculation of the steering angle δ. On the other hand, if it is determined at step S47 that either y1R or y2R has been calculated, the steering angle δ is calculated at step S48 utilizing the appropriate lateral position value y1R or y2R.

At step S43, if neither y1L nor y2L has been calculated, the program proceeds to step S46 for determination of whether y1R or y2R has been calculated. If one of those values has been calculated, the steering angle δ for the vehicle is calculated at step S48 based on either the lateral position y1R determined from one laser pulse emitted by the laser radar on the right side of the vehicle, or the lateral position y2R determined from the other laser pulse emitted by the laser radar on the right side of the vehicle. If it is determined at step S46 that neither the lateral position y1R or the lateral position y2R has been calculated, the program proceeds to step S49 where it is determined that no target has been detected. The program then once again starts over.

The present invention provides an automated vehicle guidance system which requires minimal, if any, modification to existing roadways. Thus, the present invention is well suited for relatively cost effective implementation as it does not require significant expenditure of time and money insofar as outfitting existing highways and other appropriate roadways with infrastructures necessary for making the system work. To the extent the reference markings 22', 22" may have to be provided, the cost of such an addition will be relatively low.

Since the system is designed to be used in connection with existing highways and other roadways, the parameters of the system are preferably selected with a view towards the conditions of existing highways and other roadways. For example, the value for the angular offset φ of the radar axis relative to the vehicle axis will preferably be selected in consideration of the fact that if the angular offset φ is too large, the laser radar may not be able to effectively view the approaching road geometry, thereby reducing the required response time and the control stability. On the other hand, if the angular offset φ is too small, this will likely increase the error between the estimated lateral vehicle position and the actual lateral vehicle position in the case of a single measurement system (such as that described above with reference to FIG. 1). Also, when the angular offset φ is quite small, the distance d becomes quite large. Additionally, the laser radar may actually lose sight of the reference marking, particularly where the yaw angle is very small. Consideration will also be given to the particular width of the lanes on the road surface.

Various other parameters such as the vehicle speed, weight distribution on the vehicle, curve radius, steering response time and road friction, to name a few, should also be taken into consideration when selecting the parameters for operating the system.

An automated vehicle guidance system in accordance with the present invention is highly advantageous in that it provides an accurate determination of the vehicle relative to the desired travel path. This information can then be used to accurately and reliably guide the vehicle along the desired path. The system is also able to detect desired path references over a significantly wide range of area which is useful in ensuring continued and proper operation of the system.

Figure 14:
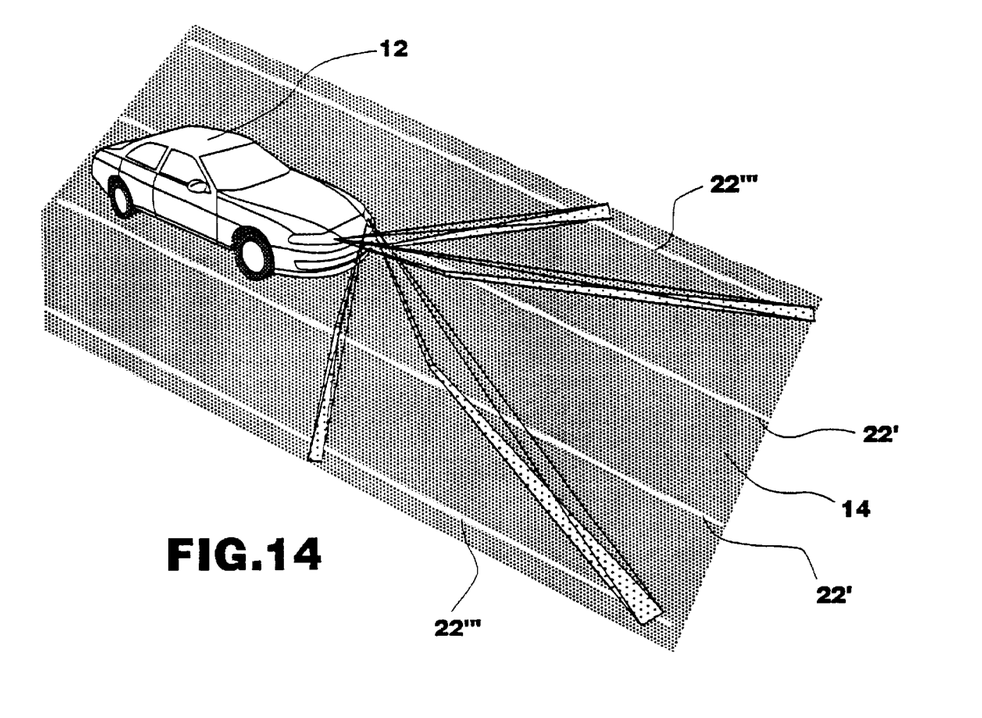
FIG. 14 is a perspective view of a vehicle travelling along a highway or other road surface illustrating that the laser pulses can be provided with a field of view covering desired path reference markings delineating adjacent lanes

Other advantages can also realized through implementation of the present invention. For example, although the automated vehicle guidance system according to the present invention has been described above in the context of guiding the vehicle movement to maintain the vehicle in a given lane, the system can be employed to control other aspects of automated vehicle guidance such as lane changing. In this regard, the laser radar unit(s) mounted on the vehicle can be appropriately selected to provide a field of view that covers the desired path reference disposed along adjacent lanes as depicted in FIG. 14. This system can be designed so that when the vehicle is being guided along the desired lane, the laser pulses reflected from the far desired path reference 22'" (i.e., the desired path reference delineating the adjacent lanes) are ignored so that vehicle guidance is effected by information derived from the laser pulses reflected from the near desired path references 22' (i.e., the desired path reference disposed along the lane in which the vehicle is being guided). At an appropriate time after initiation of a lane changing operation (which may be achieved by initially manually turning the wheel in the desired turning direction, by manually operating a switch or possibly through automated means), vehicle guidance is effected based on information derived from the laser pulses reflected from the far desired path references 22'".

The use of the crossing laser pulse beam arrangement shown in FIGS. 9, 10, 11 and 14 is particularly well suited for use in connection with the aspect of vehicle guidance involving lane changing. This crossing beam arrangement permits continual vehicle guidance during lane changing due to the fact that the desired path reference being crossed by the vehicle during the lane change is always within the field of at least one of the crossing beams. Thus contact with the desired path reference marker is not lost during the lane changing operation.

The automated vehicle guidance system of the present invention is also capable of detecting the presence of another vehicle or some other object in an adjacent lane. That is, when one or more of the laser pulses which are reflected back do not fall within the limits determined to be indicative of a laser reflected off the desired path reference, it can be assumed that there is a vehicle in the adjacent lane. This would then provide an indication that, for example, a lane change operation should not be undertaken.

It is also possible to continually monitor the position of vehicles in adjacent lanes to determine, for example, if a passing vehicle in an adjacent lane is beginning to change lanes in front of another vehicle. In that way, the vehicle in front of which the passing vehicle is moving can automatically brake or otherwise slow down to avoid hitting the car.

The principles, preferred embodiments and modes of operation of the present invention have been described above. The invention which is intended to be protected herein should not, however, be construed as limited to the particular forms disclosed, as they are to be regarded as illustrative rather than restrictive. Variations and changes may be made by others, and equivalents employed, without departing from the spirit of the present invention as set forth in the claims. Accordingly, the foregoing detailed description should be considered exemplary in nature and should not serve to limit the scope and spirit of the present invention as set forth in the appended claims.

What is claimed is:

1. Automated vehicle guidance system for guiding a movable vehicle having a vehicle axis along a predetermined desired path over a surface that is provided with first and second desired path references positioned on opposite sides of the desired path, comprising:

a first laser pulse transmitter positioned on the vehicle on one side of the vehicle axis for transmitting laser pulses towards an opposite side of the vehicle and towards the first desired path reference;

a second laser pulse transmitter positioned on the vehicle on the opposite side of the vehicle axis for transmitting laser pulses towards the one side of the vehicle and towards the second desired path reference;

a first laser pulse receiver positioned on the vehicle and operatively associated with the first laser pulse transmitter for receiving laser pulses transmitted by the first laser pulse transmitter and reflected from the first desired path reference;

a second laser pulse receiver positioned on the vehicle and operatively associated with the second laser pulse transmitter for receiving laser pulses transmitted by the second laser pulse transmitter and reflected from the second desired path reference;

a steering actuator mounted on the vehicle for steering the vehicle;

a control device connected to the steering actuator and to the first and second laser pulse receivers for controlling the steering actuator based on reflected laser pulses received by the first and second laser pulse receivers to guide the vehicle along the predetermined desired path.

2. Automated vehicle guidance system according to claim 1, wherein said control device includes one time measurement system connected to said first laser pulse receiver for producing a signal indicative of a time differential between when a laser pulse is transmitted by said first laser pulse transmitter and when the transmitted laser pulse reflected from said first desired path reference is received by the first laser pulse receiver and another time measurement system connected to said second laser pulse receiver for producing a signal indicative of a time differential between when a laser pulse is transmitted by said second laser pulse transmitter and when the transmitted laser pulse reflected from said second desired path reference is received by the second laser pulse receiver.

3. Automated vehicle guidance system according to claim 2, wherein said control device includes a computer operatively associated with said time measurement systems for determining, on the basis of said signals, the distance between a predetermined point on the vehicle and the desired path references.

4. Automated vehicle guidance system according to claim 1, wherein said control device includes a computer for determining a yaw angle of the vehicle.

5. Automated vehicle guidance system according to claim 1, wherein said first and second laser pulse transmitters each include a beam splitter for splitting the laser pulse transmitted by each respective laser pulse transmitter into two laser pulses which are each oriented at a different angle with respect to the vehicle axis.

6. Automated vehicle guidance system for guiding a movable vehicle having a vehicle axis along a predetermined desired path over a surface that is provided with at least one desired path reference, comprising:

a laser radar for emitting a laser pulse along a radar axis towards the at least one desired path reference, for receiving a laser pulse reflected from the at least one desired path reference and for determining the distance between the laser radar and the at least one desired path reference along the radar axis on the basis of time-of-flight of said laser pulse emitted towards and reflected from said at least one desired path reference;

a steering actuator for steering the vehicle; and a computer connected to the laser radar and the steering actuator for determining, based on the distance determined by said laser radar, a lateral position of the vehicle relative to the desired path and for controlling the steering actuator to guide the vehicle along the desired path.

7. Automated vehicle guidance system according to claim 6, wherein said laser radar includes a laser pulse transmitter which emits a laser pulse and a laser pulse receiver which receives a laser pulse reflected from the at least one desired path reference.

8. Automated vehicle guidance system according to claim 7, wherein said laser pulse transmitter includes a beam splitter for splitting each laser pulse emitted by the laser pulse transmitter into two substantially simultaneously emitted laser pulses which are each oriented at a different angle with respect to the vehicle axis.

9. Automated vehicle guidance system according to claim 6, wherein said laser radar includes means for emitting substantially simultaneously first and second laser pulses along respective first and second radar axes which are each oriented at a different angle relative to the vehicle axis for determining a first distance between the laser radar and the at least one desired path reference along said first radar axis and a second distance between the laser radar and the at least one desired path reference along the second radar axis.

10. Automated vehicle guidance system according to claim 9, wherein said computer determines, on the basis of said first and second distances, a yaw angle of the vehicle relative to the desired path.

11. Automated vehicle guidance system according to claim 6, wherein said laser radar is a first laser radar that is adapted to emit a laser pulse along a first radar axis that crosses the vehicle axis and that is directed towards the at least one desired path reference, and including a second laser radar for emitting another laser pulse along a second radar axis that crosses the vehicle axis towards another desired path reference positioned on a side of the desired path opposite said at least one desired path reference and for receiving a laser pulse reflected from the another desired path reference to determine the distance between the second laser radar and the another desired path reference along the second radar axis.

12. Automated vehicle guidance system according to claim 6, wherein said laser radar includes a time measurement system for determining said distance along the radar axis based on a time differential between when the laser pulse is emitted and when said emitted laser pulse is reflected from the at least one desired path reference and received by the laser radar.

13. Automated vehicle guidance system according to claim 6, wherein said laser radar axis is obliquely oriented with respect to said vehicle axis.

14. Method for automated guidance of a movable vehicle having a vehicle axis along a predetermined desired path over a surface that is provided with at least one desired path reference, comprising:

determining a distance from a point on the vehicle to the at least one desired path reference along a radar axis by emitting a laser pulse along the radar axis towards the at least one desired path reference, receiving the laser pulse reflected from the at least one desired path reference and determining said distance to the at least one desired path reference on the basis of time-of-flight of the laser pulse;

determining a lateral position of the vehicle relative to the desired path based on said distance; and controlling a steering actuator operatively associated with the vehicle when the lateral position of the vehicle is offset from the desired path to guide the vehicle along the desired path.

15. Method according to claim 14, wherein said distance is one distance, and including determining another distance from said point on the vehicle to the at least one desired path reference along another radar axis by emitting another laser pulse along the another radar axis towards the at least one desired path reference, receiving the another laser pulse reflected from the at least one desired path reference and determining said another distance to the at least one desired path reference on the basis of time-of-flight of the another laser pulse.

16. Method according to claim 15, including determining a yaw angle of the vehicle relative to the desired path based on said one distance and said another distance.

17. Method according to claim 14, wherein said distance is one distance, and including determining another distance from a point on said vehicle to another desired path reference positioned on a side of the desired path opposite said at least one desired path reference by emitting another laser pulse along another radar axis towards said another desired path reference, receiving the another laser pulse reflected from said another desired path reference and determining said another distance to the at least one desired path reference on the basis of time-of-flight of the another laser pulse.

18. Method according to claim 17, including determining a yaw angle of the vehicle relative to the desired path based on said one distance and said another distance.

19. Method according to claim 14, wherein said laser pulse is emitted towards a reflective stripe positioned on the surface along which the vehicle travels and is reflected from said stripe, said stripe being spaced from the desired path.

20. Method according to claim 14, wherein said laser pulse is emitted towards a reflective strip positioned on a barrier that is located at a spaced apart distance from the desired path and is reflected from said strip.

21. Method according to claim 14, wherein said step of controlling the steering actuator includes controlling the steering actuator to maintain the vehicle in a current lane in which the vehicle is travelling.

* * * * *

UNITED STATES PATENT AND TRADEMARK OFFICE
CERTIFICATE OF CORRECTION

PATENT NO. : 5,875,408
DATED : February 23, 1999
INVENTOR(S) : Mark P. Bendett et al.

It is certified that error appears in the above-identified patent and that said Letters Patent is hereby corrected as shown below:

<u>Title page,</u>
Item [75], Inventors, "Alan Y. Aral" is corrected to read -- Alan Y. Arai --.

Signed and Sealed this

First Day of July, 2003

JAMES E. ROGAN
*Director of the United States Patent and Trademark Office*